(12) United States Patent
Lederer et al.

(10) Patent No.: US 6,885,933 B2
(45) Date of Patent: Apr. 26, 2005

(54) SIGNAL CORRECTING DEVICE

(75) Inventors: Dieter Lederer, Ludwigsburg (DE); Michael Pfeil, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/450,678

(22) PCT Filed: Sep. 19, 2002

(86) PCT No.: PCT/DE02/03516

§ 371 (c)(1), (2), (4) Date: Jun. 17, 2003

(87) PCT Pub. No.: WO03/038532

PCT Pub. Date: May 8, 2003

(65) Prior Publication Data

US 2004/0186654 A1 Sep. 23, 2004

(30) Foreign Application Priority Data

Oct. 25, 2001 (DE) .......................................... 101 52 148
Sep. 7, 2002 (DE) .......................................... 102 41 557

(51) Int. Cl.$^7$ ................................................. B60T 7/12
(52) U.S. Cl. ........................ 701/109; 701/101; 701/102; 701/103; 701/110; 700/28; 700/35; 700/39
(58) Field of Search ................................. 701/101, 102, 701/103, 104, 110; 700/28, 39, 35

(56) References Cited

U.S. PATENT DOCUMENTS

| 4,584,982 A | | 4/1986 | Mayer et al. ............... 123/430 |
| 5,524,600 A | * | 6/1996 | Wild ........................... 123/698 |
| 5,873,350 A | * | 2/1999 | Wild et al. .................. 123/520 |
| 6,394,063 B1 | | 5/2002 | Volz et al. .................. 123/295 |

FOREIGN PATENT DOCUMENTS

| DE | 41 05 740 | 9/1991 |
| DE | 199 36 269 | 2/2001 |

* cited by examiner

Primary Examiner—Henry C. Yuen
Assistant Examiner—Johnny H. Hoang
(74) Attorney, Agent, or Firm—Walter Ottesen

(57) ABSTRACT

An arrangement for correcting a signal (S) is suggested which contains a signal evaluation (28), which determines a characteristic variable of the input signal (US) of a controller (26) and/or the actuating variable (fr) of the controller (26) and/or at least one determined corrective signal (ora, fra) and/or at least one of their mean values (form) and compares the characteristic variable to at least one threshold value (SC1, SC2, SC3) and, when reaching or passing through at least one threshold value (SC1, SC2, SC3), an output signal (A) is made available at the end of the determination of the corrective signal (ora, fra).

10 Claims, 3 Drawing Sheets

SIGNAL CORRECTING DEVICE

BACKGROUND OF THE INVENTION

An arrangement is known from U.S. Pat. No. 4,504,982, which describes a correction of a signal, which is used as a fuel metering signal for operating an internal combustion engine. The object is, for example, the attainment of a pregiven air/fuel ratio (lambda) in order, on the one hand, to obtain the least possible consumption of fuel and, on the other hand, to obtain an exhaust-gas composition which can substantially be freed of poisonous constituents. Different corrective quantities are provided which are directed to the compensation of different faults.

One such fault is, for example, a defective measurement of an air-mass sensor which operates multiplicatively on the fuel metering. Another fault is, for example, leakage-air influences which operate additively on the fuel metering. Furthermore, faults can occur in the utilized fuel injection valves which are especially caused by switch delays. These faults likewise operate additively. Such systematic faults are corrected by the corrective quantities in their effect.

The faults operate differently in different load ranges/rpm ranges of the internal combustion engine. Additive faults preferably occur in the lower load/rpm range and multiplicative faults occur especially in the mid load/rpm range.

In accordance with statutory regulations, exhaust-gas relevant faults are to be detected and displayed with on-board means. The correction can assume this task. If, for example, the corrective intervention lies above or below a permissible threshold, then this indicates a fault. In order to ensure an optimal cooperative relationship of the various engine control and diagnostic functions, the correction is enabled phase-wise by means of a time and/or event control.

U.S. Pat. No. 6,394,063 discloses a program for controlling an internal combustion engine wherein the switchover between a stratified operation and a homogeneous operation is provided in a direct-injecting internal combustion engine.

In stratified operation, the engine is operated with a stratified cylinder charge and high air excess in order to achieve the lowest possible fuel consumption. In contrast, at higher load the engine is operated with a homogeneous cylinder charge in order to make available the highest possible power. The correction for the signal is based on an actuating variable which is determined from the signal of a lambda probe. For this reason, a proper lambda probe control signal must be present at least during the correction. In the fuel-saving stratified operation of the direct-injecting engine for which a high air excess occurs, the signal of the lambda probe is, however, not always reliable because of the high air excess. The correction therefore takes place in a practical manner only during homogeneous operation. In the event that a corrective phase is provided and the internal combustion engine is in stratified operation at this time, a switchover into the homogeneous operation takes place at the start of the correction. With a view to the optimization of the fuel consumption, a time duration of the correction as short as possible is strived for.

Additional target conflicts with other control functions can result during the time duration of the correction. One such function is, for example, tank venting which has an influence on the signal to be corrected and therefore cannot be activated during the time duration of the correction. The time duration of the correction should be optimized also for such reasons.

SUMMARY OF THE INVENTION

According to the invention, first a corrective signal determination is provided which determines at least one corrective signal at least from an input signal or an actuating variable of a controller. The signal, which is to be corrected, influences the input signal of the controller which makes available the actuating variable which can be identical to the signal to be corrected or which at least influences the signal to be corrected. A provided signal evaluation determines further a characteristic variable of the input variable and/or of the actuating variable of the controller and/or of the at least one determined corrective signal and/or their mean value and compares the obtained characteristic variable to at least one threshold value. The signal evaluation outputs a switch-off signal when the threshold value is reached or passed through. The shut-off signal ends the determination of the corrective signal.

An essential advantage of the arrangement of the invention is the possibility of ending the correction with the presence of pregiven criteria. The time, which is needed for the correction, is reduced to the necessary amount. In this way, more time is available for other functions such as the tank venting mentioned initially herein or the operation of the engine in the fuel-saving stratified operation.

According to a first embodiment, the characteristic variable is identical either to the input signal, the actuating variable, the corrective signal and/or especially its mean value.

According to another embodiment, which is alternatively or additionally provided to the first embodiment, the characteristic variable corresponds to the slope of the input signal and/or to the slope of the actuating variable and/or to the slope of the corrective signal and/or their mean value.

An advantageous further embodiment provides that the slope is only evaluated when the input signal and/or the actuating variable and/or the corrective signal and/or their mean value have passed through the at least one pregiven threshold.

Another advantageous embodiment provides that the determination of the corrective signal is only provided when pregiven peripheral conditions are present. Such peripheral conditions are, for example, a load and/or an rpm and/or a temperature of the internal combustion engine.

According to an embodiment, an additive correction of the signal to be corrected is provided. Alternately or in addition, a multiplicative correction can be provided in a further embodiment.

An advantageous embodiment provides that, after passing through the pregiven threshold values, the determination of the corrective signal is ended only after a pregiven time duration has elapsed. With this embodiment, it can be ensured that the correction has led to a stable result.

Another advantageous embodiment provides that the input signal and/or the actuating variable and/or the corrective signal and/or its mean value is compared to at least one limit value and that a fault announcement takes place when reaching or passing through the limit value.

BRIEF DESCRIPTION OF THE DRAWINGS

The invention will now be described with reference to the drawings wherein.

DETAILED DESCRIPTION OF THE INVENTION

Figure 1:
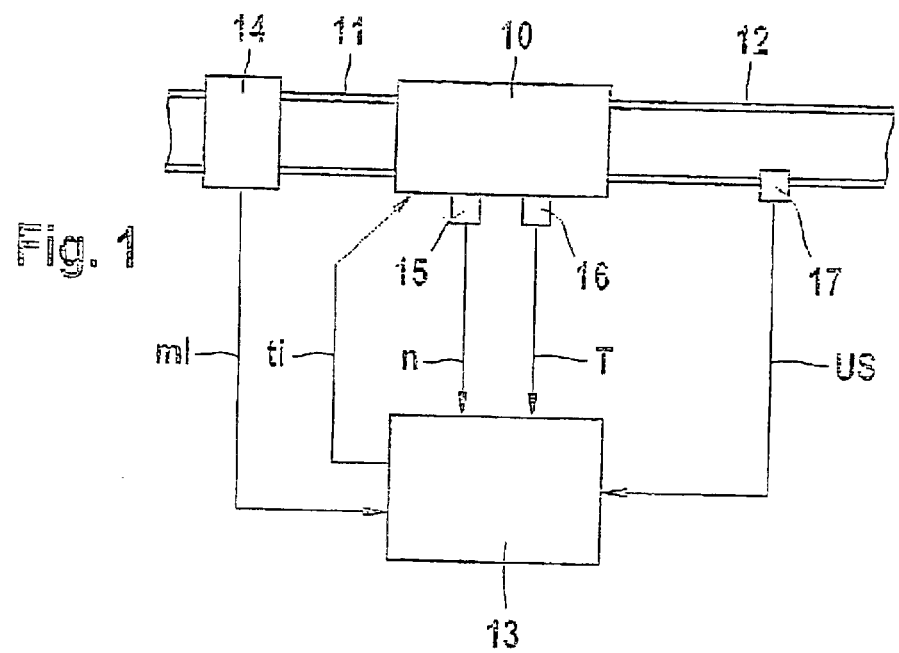
FIG. 1 shows the technical background of the invention.

In FIG. 1, an internal combustion engine 10 is shown which includes an intake manifold 11. A control apparatus 13 outputs fuel-metering signals ti in dependence upon signals which are made available by sensors (14, 15, 16, 17).

The air-mass sensor 14 supplies a signal to the control apparatus 13 as to the mass ml inducted by the engine 10. The rpm sensor 15 supplies an rpm signal (n) to the control apparatus 13. The temperature T of the engine 10 is made available by a temperature sensor 16 and the exhaust-gas sensor 17 supplies a probe signal. This probe signal is an input signal US of a controller and is for the exhaust-gas composition in the exhaust-gas pipe 12 of the internal combustion engine 10. The controller is not shown in detail in FIG. 1 and is contained in the control apparatus 13.

From these signals and, if required, additional signals as to additional operating characteristic variables of the engine 10, the control apparatus 13 determines, in addition to further actuating variables, the fuel-metering signals ti so that a desired performance of the engine 10, and especially a desired exhaust-gas composition results.

Figure 2:
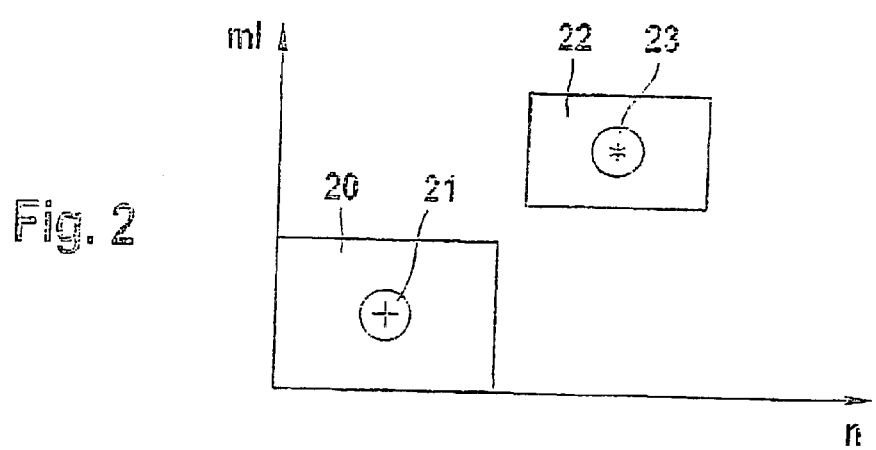
FIG. 2 shows the position of two different corrective regions.

FIG. 2 shows the position of the two corrective regions as a function of the air mass ml and of the rpm signal (n). A first load/rpm region lies in the low load/rpm range. There, an additive correction takes place which is given symbolically in the first load/rpm region 20 by an addition member 21. A second load/rpm region 22 lies in the higher load/rpm range. There, multiplicative correction is provided which is symbolically indicated by a multiplier member 23.

Figure 3:
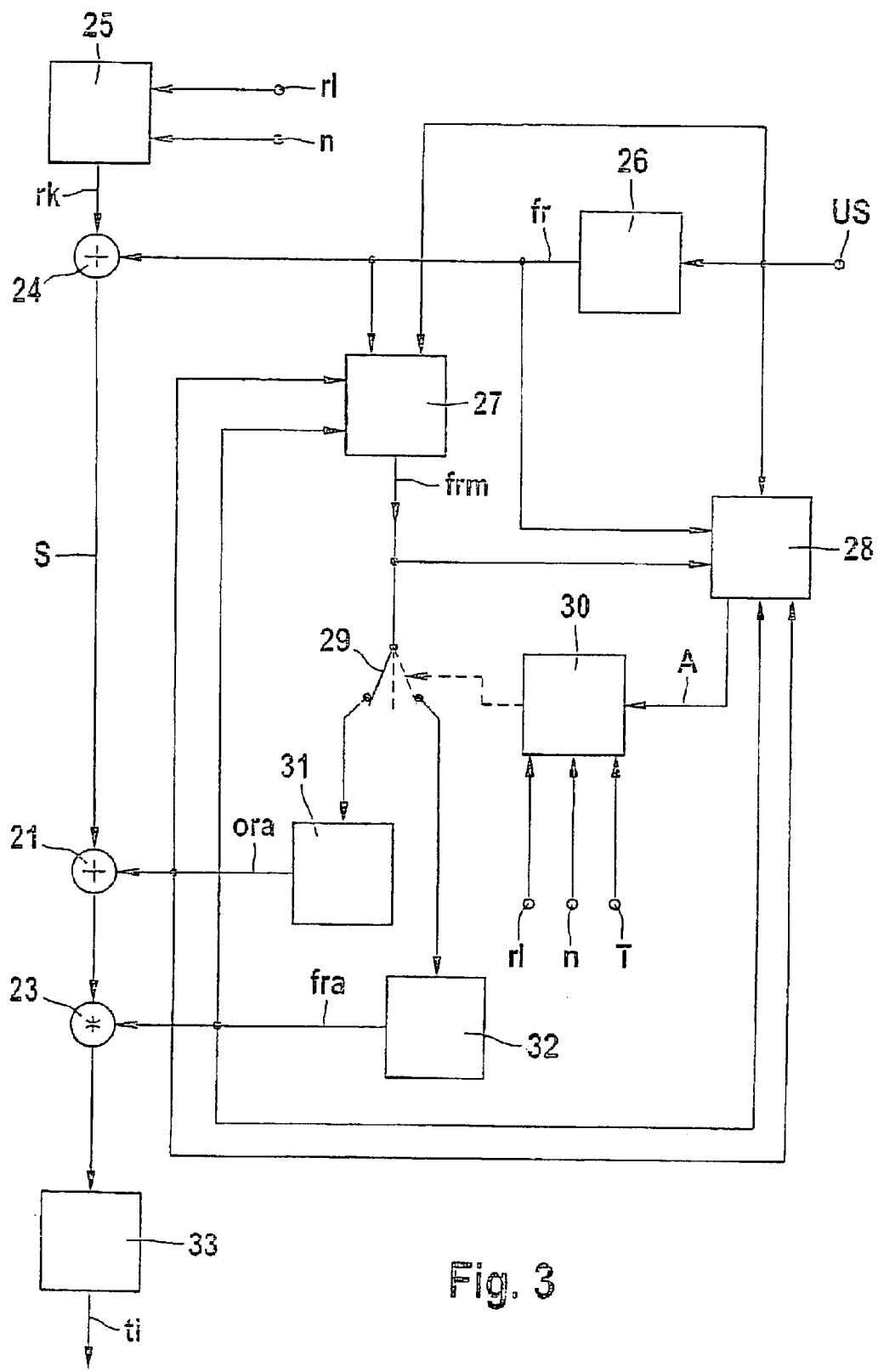
FIG. 3 shows a block circuit diagram of an arrangement of the invention.

FIG. 3 shows a block circuit diagram of an arrangement of the invention. A signal S, which is to be corrected, is obtained by a multiplication 24 from a precontrol signal rk and an actuating variable fr. The precontrol signal rk is determined in a precontrol signal determination 25, for example, from the rpm signal (n) and a relative air charge rl which can be derived from the air mass ml. The actuating variable fr is supplied by a controller 26 which obtains the actuating variable fr from the input signal US.

The input signal US is supplied, in addition to the controller 26, to a mean value former 27 as well as to a signal evaluation 28. The actuating variable fr, which reaches the multiplier 24, is furthermore likewise supplied to the signal evaluation 28.

The mean value former 27 determines at least an actuating variable mean value form, which is supplied to the signal evaluation 28 as well as also to a change-over switch 29. In addition to the actuating variable mean value form, the mean value former 27 determines, if required, additional mean values not shown in FIG. 3.

The change-over switch 29 is driven by a switch control 30 which receives as input signals the relative air mass rl, the rpm signal (n), the temperature T as well as an output signal A of the signal evaluation 28. The change-over switch 29 can be connected to a first and second corrective signal determination (31, 32) as well as being switched into a neutral position.

The first corrective signal determination 31 outputs a first corrective signal ora to the following: the addition member 21 known from FIG. 2, the mean value former 27 and the signal evaluation 28. The second corrective signal determination 32 outputs a second corrective signal fra to the following: the multiplier member 23 known from FIG. 2, the mean value former 27 and likewise to the signal evaluation 28.

The signal S is corrected via the addition member 21 and the multiplier member 23 and reaches a signal converter 33 which makes the fuel-metering signals ti available.

FIG. 4 shows signal traces as a function of the time (t).

Figure 4A:
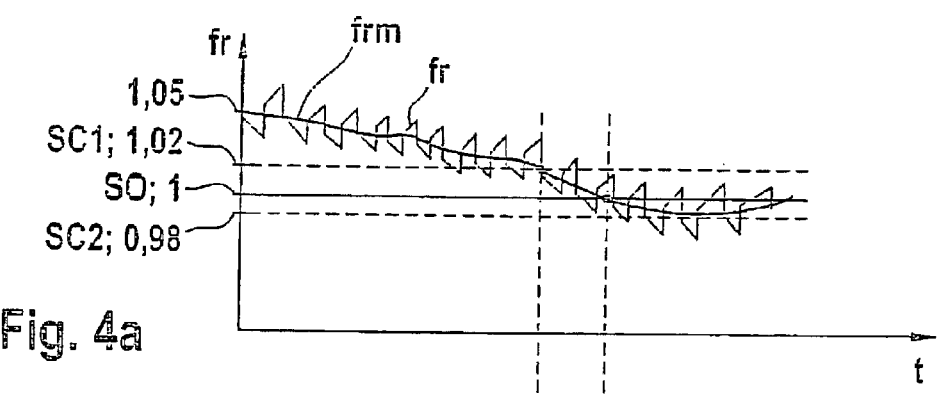
FIG. 4 shows signal traces as a function of time.

FIG. 4a shows the actuating variable fr and the actuating variable mean value form. SO is a desired value of the actuating variable fr which should have the value 1. The values 1.05 as well as 1.02 of the actuating variable mean value form are shown. The value 1.02 of the actuating variable mean value form corresponds to a first threshold value SC1. Furthermore, a second threshold value SC2 is shown to which the value 0.98 is assigned.

Figure 4B:
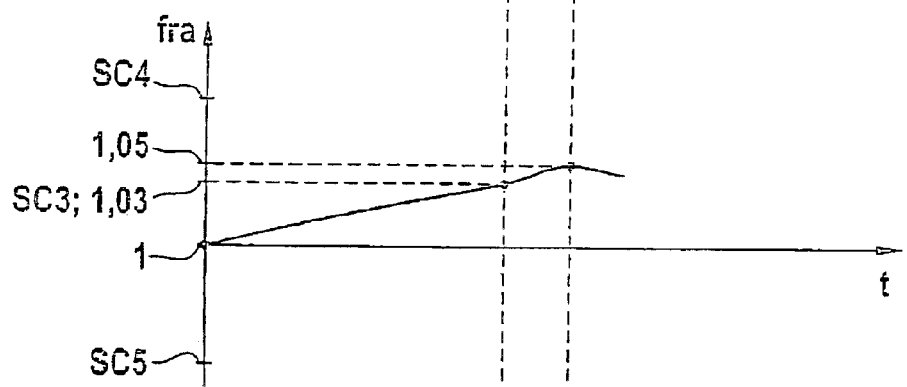

FIG. 4b shows a second corrective variable fra. The values 1 and 1.03 as well as 1.05 of the second corrective variable fra are emphasized. The value 1.03 corresponds to a third threshold value SC3. Also shown are a first and second limit value (SC4, SC5).

Figure 4C:
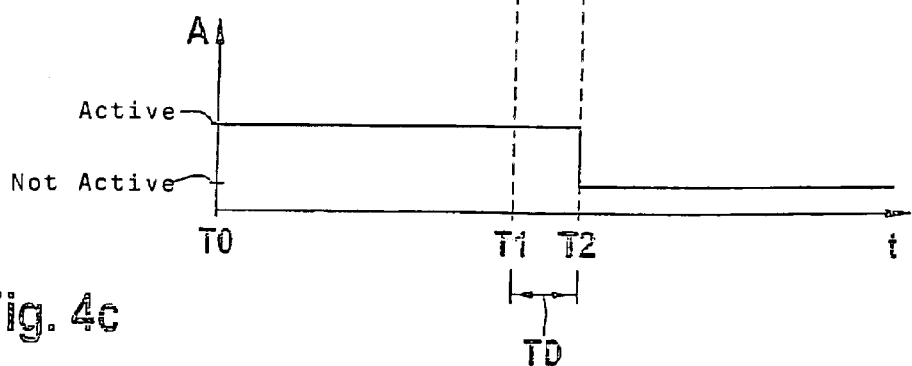

FIG. 4c shows the output signal A as a function of time (t). The output signal A can exhibit the value "active" or "nonactive". In addition to the start time point T0, a first time point T1 is emphasized at which the actuating variable mean value form reaches the first threshold value SC1 as well as the second corrective variable fra reaches the third threshold value SC3. Further emphasized is a second time point T2 which occurs after the first time point T1 after the elapse of a time duration TD.

The operation of the arrangement, which is shown as a block circuit diagram in FIG. 3, is explained with reference to the signal traces shown in FIG. 4.

An object of the arrangement is to determine the fuel-metering signals ti in the signal converter 33 in such a manner that, for example, a desired exhaust-gas composition occurs in the exhaust-gas pipe 12 of the internal combustion engine 10. This exhaust-gas composition is reflected in the probe signal or in the input signal US. In the embodiment shown, a stoichiometric mixture should, for example, be obtained. Based on a known lambda probe as an exhaust-gas sensor 17, a voltage of, for example, approximately 450 mv occurs for a stoichiometric mixture. The stoichiometric mixture should be reflected also in the actuating variable fr of the controller 26. The desired value SO of the actuating variable fr should therefore exhibit symbolically the numerical value 1 which corresponds to a stoichiometric air/fuel ratio.

The signal converter 33 could already determine the fuel-metering signal ti from the actuating variable fr alone. So that the controller 26 can be designed to a manipulable control region, the precontrol signal determination 25 is additionally provided as needed which likewise should contribute to obtain the signal S. The precontrol signal determination 25 determines, for example, the precontrol variable rk, for example, based on stored characteristic lines from the relative air charge rl and, for example, the rpm signal (n). The precontrol variable rk is multiplied by the actuating variable fr in the multiplier 24. The relative air charge rl is referred to a maximum charge of a combustion chamber of the internal combustion engine 10 with air and thereby yields the fraction of the maximum combustion chamber charge or cylinder charge. The relative air charge rl is essentially formed from the air mass ml. The precontrol variable rk corresponds substantially to the fuel quantity which is assigned to the relative air charge rl. The formation of the precontrol variable rk is shown here simplified.

In addition to this first influencing of the signal S by the precontrol quantity rk, a further correction of the signal S is provided by means of the two corrective signals (ora, fra). The separation into two corrective signals (ora, fra) affords the advantage that the first corrective signal ora, for example, operates additively via the addition member 21 on the signal S in a correcting manner while the second corrective signal fra operates multiplicatively on the signal S via the multiplier member 23. It is understood that additional corrective quantities can be provided which in some way apply an influence to the signal S.

As already explained with respect to FIG. 2, the first corrective signal ora is responsible especially for correcting the signal S in the low load/rpm range of the internal combustion engine 10 while the second corrective signal fra intervenes in the higher load/rpm range of the engine 10.

The formation of the corrective signals (ora, fra) is dependent preferably on operating conditions which are supplied to the switch control 30. These are especially the relative air charge rl, the rpm signal (t) and/or the temperature T of the internal combustion engine 10. In addition to these operating characteristic variables, other or further operating variables can be provided. Furthermore, the output signal A of the signal evaluation 28 is conducted to the switch control 30. The output signal A indicates basically the "active" or "nonactive" state of the corrective signal determination (30, 31). Such a corrective signal determination is explained with respect to FIG. 4.

The corrective signal determinations (31, 32) can determine the corrective signals (ora, fra), for example, directly from the input signal US. Preferably, the actuating variable fr is, however, used. In dependence upon inputs, which are not explained in greater detail at this point, an oscillating actuating variable fr (as shown in FIG. 4a) can be provided about an actuating variable mean value form. The actuating variable determinations (31, 32) therefore determine preferably the corrective quantities (ora, fra) from mean values, especially from a mean value of the input signal US and/or preferably, from the actuating quantity mean value form. In FIG. 3, the actuating variable mean value form is shown only by way of example at the output of the mean value former 27.

This selection also forms the basis of FIG. 4a.

It is assumed that the output signal A is "active" and that the switch control has switched the change-over switch 29 based on operating conditions in such a manner that the actuating variable mean value form is conducted to the second corrective signal determination 32. At start point T0 according to FIG. 4c, the actuating variable mean value frm lies at a numerical value of, for example, 1.05. This numerical value should, however, lie at least approximately at its desired value 30 corresponding to the numerical value 1. The first corrective signal fra exhibits the numerical value 1 at start time point T0 so that, at this time point, no correction should be present. With increasing time (t), a change of the first corrective signal fra takes place so that the actuating variable mean value form moves in sequence in the direction of the numerical value 1. At the first time point T1, the actuating variable mean value form passes through the first threshold value SC1 corresponding to the numerical value 1.02. At the same first time point T1, the numerical value of the second corrective signal fra is 1.03. The signal evaluation 28 determines the reaching of the first threshold value SC1.

The signal evaluation 28 first receives the input signal US and/or the actuating variable fr and/or, preferably, at least one of their mean values. FIG. 3 is restricted by way of example to the mean value formation of the actuating variable fr so that the further description picks by way of example the actuating variable mean value form. The signal evaluation 28 knows the first and second threshold values (SC1, SC2) to which the actuating variable mean value form is compared. After determining the reaching or pass through of the first threshold value SC1 by the actuating variable mean value form, the further formation of the second corrective signal fra can be ended. However, in order to be able to consider the further development of the actuating variable fr or of the actuating variable mean value form, preferably, the corrective signal determination is continued starting from the first time point T1 still for a pregiven time duration TD up to the second time point T2. In the embodiment shown, the actuating variable mean value form (by chance) precisely reaches the desired value 30 corresponding to the numerical value 1. At the same time, during the time duration TD, the second corrective signal fra increases from the numerical value 1.03 to the numerical value 1.05. In the embodiment shown, the correction was therefore successful.

In the same way, and with the presence of corresponding operating conditions, the determination of the first corrective signal ora takes place in the first corrective signal determination 31 by a corresponding actuation of the change-over switch 29 by the switch control 30.

The signal evaluation 28 can, in addition to the threshold values (SC1, SC2), compare other signals to corresponding other threshold values. As already mentioned, the signal evaluation 28 can consider directly the input signal US and/or the actuating variable fr or at least one of their mean values. Alternatively, or in addition, the signal evaluation 28 can also apply the obtained corrective signals (ora, fra) themselves and/or their mean value for the evaluation. In FIG. 3, the two corrective values (ora, fra) are therefore connected directly to the signal evaluation 28 as well as indirectly to the signal evaluation 28 via the mean value former 27. Preferably, the corrective quantities (ora, fra) are conducted directly to the signal evaluation 28 because they proceed preferably from the integration processes and therefore already have undergone a mean value formation. The signal evaluation 28 has the third threshold value SC3 for the comparison of the corrective signals (ora, fra). Additional threshold values can of course be provided for negative signal values. Furthermore, additional threshold values can be separately provided for the different corrective signals (ora, fra).

An advantageous embodiment provides that the signal evaluation compares all evaluable signals additionally to pregiven limit values. In the embodiment shown in FIG. 4b, two such limit values, the first and second limit values (SC4, SC5) are shown to which, by way of example, the second corrective variable fra is compared. When reaching or passing through a limit value (SC4, SC5), the signal evaluation 28 outputs, in addition to switching signal A (which is switched to nonactive), additionally a fault announcement which can be applied for an on-board other signal evaluation.

Up to now, the processing of the individual signals was described, especially the processing of the input signal US, the actuating variable fr, a mean value, the first and second corrective signals fra. Alternatively or in addition, the slope of the individual curve traces can especially be applied in the signal evaluation 28. For the slope of the at least one signal, which is to be evaluated, the threshold values and limit values which fit thereto are to be pregiven. Generally, the signal evaluation 28 therefore evaluates characteristic variables of the input signal US and/or the actuating variable fr and/or the corrective signals (ora, fra) or at least one of their mean values.

An advantageous further embodiment provides that the slope is applied as characteristic variable only when the input signal US and/or the actuating variable fr and/or the corrective signal (ora, fra) or their mean values reach or pass through at least one threshold value. With this measure, the adaptation can be brought to a successful conclusion within the shortest possible time supplementary or as an alternative to the pregiven time duration TD. Furthermore, expansive diagnoses are possible with this measure with respect to exceeding limit values which give cause to a fault announcement.

After ending the determination of the corrective signal (ora, fra), the corrective signal (ora, fra) is maintained at the last determined value until a renewed corrective operation begins.

The described functions and sequences in the arrangement of the invention can be realized partially or completely as software.

What is claimed is:

1. An arrangement for correcting a signal (S), the arrangement comprising:

a controller for determining an actuating variable (fr) from an input signal (US);

means for providing said signal (S) utilizing said actuating variable (fr) so as to permit said actuating variable (fr) to act on said signal (S);

corrective signal determination means for determining at least one corrective signal (ora, fra) from at least one of the following: said input signal (US), said actuating variable (fr), a mean value of said input signal (US) and a mean value of said actuating variable (fr);

a mathematical function unit including at least one of an addition member and a multiplication member and said mathematical function functioning to combine said corrective signal (ora, fra) with said signal (S); and, signal evaluation means including:

first means for determining a characteristic variable of at least one of the following: said input signal (US), said actuating variable (fr), said corrective signal (ora, fra) and at least one of the mean values of at least one of said input signal (US), said actuating variable (fr) and said corrective signal (ora, fra);

second means for comparing said characteristic variable to at least one threshold value (SC1, SC2, SC3); and, third means for making an output signal (A) available for ending said determination of said corrective signal (ora, fra) when reaching or passing through at least one of said threshold values (SC1, SC2, SC3).

2. The arrangement of claim 1, wherein the characteristic variable is identical to the input signal (US) or the actuating variable (fr) or the corrective value (ora, fra) or the mean value of one of said input signal (US), said actuating variable (fr) and said corrective signal (ora, fra).

3. The arrangement of claim 1, wherein the characteristic variable is the slope of the input signal (US) or the actuating variable (fr) or of the corrective value (ora, fra) or the mean value of one of the slopes of said input signal (US), said actuating variable (fr) and said corrective signal (ora, fra).

4. The arrangement of claim 1, wherein the slope is only applied when the input signal (US) or the actuating variable (fr) or the corrective variable (ora, fra) or the mean value thereof reaches or passes through the at least one threshold value (SC1, SC2, SC3).

5. The arrangement of claim 1, wherein the determination of the corrective variable (ora, fra) is provided when pregiven peripheral conditions are present.

6. The arrangement of claim 5, wherein a peripheral condition is a relative air charge (rl) and/or the rpm (n) and/or the temperature of the internal combustion engine.

7. The arrangement of claim 1, wherein a first corrective variable (ora) is determined which is coupled to the signal (S) via said addition member.

8. The arrangement of claim 1, wherein the determination of the second corrective variable (fra) is provided which is coupled to the signal (S) via said multiplication member.

9. The arrangement of claim 1, wherein the determination of the corrective variables (ora, fra) is provided for a pregiven time duration (TD) after reaching or passing through the threshold value (SC1, SC2, SC3).

10. The arrangement of claim 1, wherein a comparison of the characteristic variable of the input signal (US) and/or the actuating variable (fr) and/or the corrective signal (ora, fra) and/or at least one of the mean values of said input signal (US), said actuating variable (fr) and said corrective signal (ora, fra) is provided to at least one limit value (SC4, SC5) and that a fault announcement takes place when reaching or passing through the limit value (SC4, SC5).

* * * * *

UNITED STATES PATENT AND TRADEMARK OFFICE
CERTIFICATE OF CORRECTION

PATENT NO.    : 6,885,933 B2
DATED         : April 26, 2005
INVENTOR(S)   : Dieter Lederer and Michael Pfeil It is certified that error appears in the above-identified patent and that said Letters Patent is hereby corrected as shown below:

Title page,
Item [57], ABSTRACT,
Line 6, delete "(form)" and substitute -- (frm) -- therefor.

Column 8,
Line 14, delete "claim 1," and substitute -- claim 3, -- therefor.

Signed and Sealed this

Twenty-third Day of August, 2005

JON W. DUDAS
*Director of the United States Patent and Trademark Office*